United States Patent
Boccon-Gibod

(10) Patent No.: US 8,793,808 B2
(45) Date of Patent: Jul. 29, 2014

(54) DYNAMIC MEDIA ZONES SYSTEMS AND METHODS

(75) Inventor: Gilles Boccon-Gibod, Palo Alto, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 613 days.

(21) Appl. No.: 12/178,543

(22) Filed: Jul. 23, 2008

(65) Prior Publication Data

US 2009/0031431 A1      Jan. 29, 2009

Related U.S. Application Data

(60) Provisional application No. 60/951,342, filed on Jul. 23, 2007.

(51) Int. Cl.
| | | |
|---|---|---|
| G06F 7/04 | (2006.01) | |
| G11B 20/00 | (2006.01) | |
| G06F 21/00 | (2013.01) | |
| G06F 21/10 | (2013.01) | |
| G06F 21/12 | (2013.01) | |

(52) U.S. Cl.
CPC .......... *G11B 20/00739* (2013.01); *G06F 21/10* (2013.01); *G06F 21/121* (2013.01)
USPC .................. 726/30; 726/31; 726/32; 726/33; 705/57; 705/59

(58) Field of Classification Search
CPC .. G11B 20/00739; G06F 21/10; G06F 21/121
USPC .................. 726/30–33; 705/57, 59
See application file for complete search history.

(56) References Cited

U.S. PATENT DOCUMENTS

| | | | |
|---|---|---|---|
| 5,982,891 A | 11/1999 | Ginter et al. | |
| 6,735,699 B1* | 5/2004 | Sasaki et al. | 726/28 |
| 6,885,757 B2 | 4/2005 | Bloom | |
| 6,920,567 B1* | 7/2005 | Doherty et al. | 726/22 |
| 7,209,917 B2* | 4/2007 | Probst et al. | 707/706 |
| 7,577,999 B2* | 8/2009 | Narin et al. | 726/27 |
| 7,796,190 B2* | 9/2010 | Basso et al. | 348/445 |

(Continued)

FOREIGN PATENT DOCUMENTS

| | | |
|---|---|---|
| JP | 09-275555 | 10/1997 |
| JP | 10-164550 | 6/1998 |

(Continued)

OTHER PUBLICATIONS

International Search Report and Written Opinion mailed Nov. 6, 2008, for International Application No. PCT/US2008/009001.

(Continued)

*Primary Examiner* — Calvin Cheung
(74) *Attorney, Agent, or Firm* — Finnegan, Henderson, Farabow, Garrett & Dunner LLP

(57) ABSTRACT

Systems and methods are described for applying digital rights management techniques to manage zones in electronic content. In one embodiment, zones are defined in a piece of electronic content, and a license is associated with the electronic content that indicates how the zones are to be accessed or otherwise used. A digital rights management engine governs access to or other use of the zoned content in accordance with the license.

14 Claims, 10 Drawing Sheets

(56) References Cited

U.S. PATENT DOCUMENTS

| | | | |
|---|---|---|---|
| 7,877,689 B2* | 1/2011 | Gilley | 715/723 |
| 8,245,280 B2* | 8/2012 | Song et al. | 726/3 |
| 2002/0003886 A1 | 1/2002 | Hillegass et al. | |
| 2004/0003251 A1* | 1/2004 | Narin et al. | 713/172 |
| 2004/0039704 A1* | 2/2004 | Gilliam et al. | 705/50 |
| 2004/0128682 A1* | 7/2004 | Liga et al. | 725/35 |
| 2005/0195978 A1* | 9/2005 | Babic et al. | 380/231 |
| 2005/0283610 A1* | 12/2005 | Serret-Avila et al. | 713/176 |
| 2006/0026628 A1* | 2/2006 | Wan et al. | 725/32 |
| 2006/0222322 A1* | 10/2006 | Levitan | 386/68 |
| 2006/0248573 A1* | 11/2006 | Pannu et al. | 726/1 |
| 2006/0265657 A1 | 11/2006 | Gilley | |
| 2007/0014536 A1* | 1/2007 | Hellman | 386/94 |
| 2007/0100701 A1 | 5/2007 | Boccon-Gibod et al. | |
| 2007/0100768 A1 | 5/2007 | Boccon-Gibod et al. | |
| 2007/0180519 A1 | 8/2007 | Boccon-Gibod et al. | |
| 2007/0250901 A1* | 10/2007 | McIntire et al. | 725/146 |
| 2007/0269044 A1* | 11/2007 | Bruestle | 380/54 |
| 2010/0257370 A1* | 10/2010 | Yoon et al. | 713/189 |

FOREIGN PATENT DOCUMENTS

| | | |
|---|---|---|
| JP | 2001-223653 | 8/2001 |
| JP | 2002-366835 | 12/2002 |
| WO | WO 2004/038568 | 5/2004 |
| WO | WO 2007/047846 | 4/2007 |

OTHER PUBLICATIONS

International Preliminary Report on Patentability issued Jan. 26, 2010, for PCT/US2008/009001.

Office Action dated Jun. 25, 2013 for Japanese Patent Application No. 2010-518223.

Office Action dated May 10, 2012 for Australian Patent Application No. 2008279685.

Office Action dated Nov. 2, 2011 for Chinese Patent Application No. 200880109159.X.

Second Office Action dated May 22, 2012 for Mexican Patent Application MX/a/2010000921.

Office Action dated Aug. 29, 2011 for Mexican Patent Application No. MX/a/2010/000921.

* cited by examiner

DYNAMIC MEDIA ZONES SYSTEMS AND METHODS

RELATED APPLICATIONS

This application claims priority from U.S. Provisional Patent Application Ser. No. 60/951,342, entitled "Tethered Device Systems and Methods," filed Jul. 23, 2007, which is hereby incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

In modern computing systems, it is often desirable to limit access to electronic content, services, or processing resources, or to allow only certain entities to perform certain actions. A variety of techniques have been developed or proposed to enable such control. These techniques are often referred to as digital rights management (DRM) techniques because, in general terms, their goal is to manage the rights of various entities in digital or other electronic content, services, or resources. Systems and methods are presented herein for facilitating the management of electronic content. It will be appreciated that these systems and methods are novel, as are many of the components, systems, and methods employed therein.

In a preferred group of embodiments, systems and methods are provided that support the description and control of different types of zones in electronic content. For example, a zone might comprise a portion of a media presentation that has specific attributes representing constraints that a media player application must obey when playing back the presentation, such as an advertisement zone that must not be skipped, or a warning screen that must be viewed before the rest of the presentation can be viewed.

While prior systems have attempted to require users to view advertisements or warnings, these systems typically hardcoded such requirements (and the advertisements and warnings themselves) into the system architecture and provided no visibility into whether such requirements were actually honored or how many times the warnings or advertisements were viewed. Preferred embodiments of the inventive body of work described herein can be used to ameliorate some or all of these drawbacks, and to enable rich, flexible, policy-based controls to be associated with the manner in which viewing requirements are enforced and recorded, and also support the dynamic modification of such requirements, including, without limitation, modification of such requirements based on events such as the passage of time, the satisfaction of other conditions, and/or the like. In addition, preferred embodiments of the systems and methods described herein enable the dynamic insertion of content, such as an advertisement, into a piece of rights-managed content, such that playback of the advertisement is governed in accordance with policies specified, e.g., by the author, publisher, and/or distributor of the content and/or the advertisement. Thus, preferred embodiments of the systems and methods described herein enable the use of digital rights management techniques to support the insertion and controlled playback or other use of specific portions of a piece of electronic content.

It should be appreciated that embodiments of the presently described inventive body of work can be implemented in numerous ways, including as processes, apparatuses, systems, devices, methods, computer readable media, and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

Figure 1:
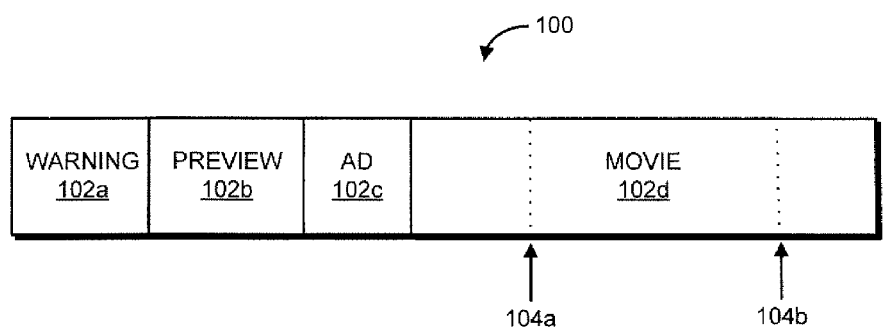
FIG. 1 is an example of an illustrative media file annotated in accordance with one embodiment.

FIG. 1 shows an example of a piece of electronic content 100 that includes several zones (102a, 102b, 102c, 102d). For example, content 100 may comprise an entire media presentation that includes a movie and additional content items associated therewith. For example, zone 102a may by a warning not to copy the movie without authorization, zone 102b may be a preview of another movie, zone 102c may be an advertisement, and zone 102d may be the movie itself. Content 100 may also include a number of markers 104a, 104b at which additional content—sometimes referred to herein as "external zones"—can be inserted at a later time (e.g., advertisements). When content 100 is packaged in accordance with a digital rights management system, access to or other use of some or all of content 100 can be governed by associated licenses (e.g., controls). In a preferred embodiment, and as described in more detail below, these licenses can specify how the zones 102, 104 that make up content 100 are to be accessed or otherwise used, and what the consequences of such access or other use are to be.

Figure 2:
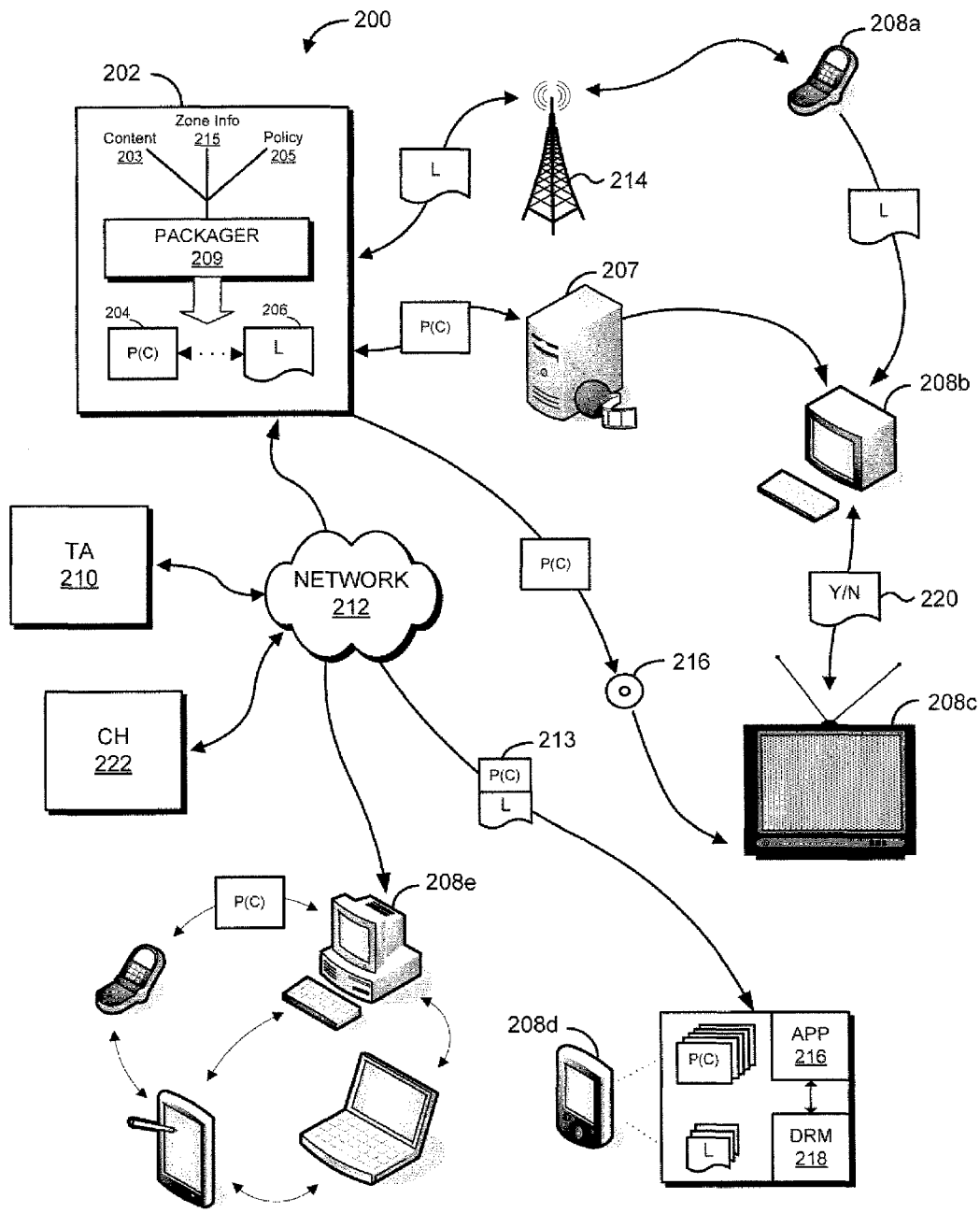
FIG. 2 shows an illustrative system for managing the use of electronic content.

FIG. 2 shows an example of a system 200 in which content such as that shown in FIG. 1 can be distributed and managed using a digital rights management system. In a preferred embodiment, a digital rights management system can be used such as that described in commonly assigned, co-pending U.S. patent application Ser. No. 10/583,693, entitled Digital Rights Management Engine Systems and Methods, filed Oct. 18, 2006, and published as Publication No. 2007-0180519-A1 ("the '693 application"), the contents of which are hereby incorporated by reference; however, it will be appreciated that any suitable digital rights management system could be used in accordance with the principles set forth herein.

As shown in FIG. 2, an entity 202 holding rights in electronic content 203, packages the content for distribution and consumption by end users 208*a-e* (referred to collectively as "end users 208," where reference numeral 208 refers interchangeably to the end user or the end user's computing system, as will be clear from the context). For example, entity 202 may comprise a content owner, creator, or provider, such as a musician, movie studio, publishing house, software company, author, mobile service provider, Internet content download or subscription service, cable or satellite television provider, the employee of a corporation, or the like, or an entity acting on behalf thereof, and content 203 may comprise any electronic content. For example, content 203 may comprise digital video, audio, or textual content, a movie, a television show, a video clip, a song, a podcast, a video game, a piece of software, an email message, a text message, a word processing document, a report, or any other entertainment, enterprise, or other content. As part of the packaging process entity 202 will typically define various zones that the content will contain, such as those described in connection with FIG. 1. This may entail inserting additional content 215 (e.g., advertisements, warnings, previews, etc.) into content 203, or may simply entail labeling portions of content 203 (e.g., some or all of a movie), and/or may entail defining markers at which additional content (e.g., advertisements, etc.) can subsequently be inserted (e.g., on the fly during playback). The packaging process will also typically entail applying any security protections dictated by the digital rights management system being used. For example, the content may be secured by one or more cryptographic mechanisms such as encryption or digital signature techniques, for which a trust authority 210 may be used to obtain the appropriate cryptographic keys, certificates, and/or the like.

In the example shown in FIG. 2, entity 202 uses a packaging engine 209 to associate a license or other form of electronic control 206 with the packaged content 204. License 206 is based on the policies 205 or other wishes of entity 202, and specifies permitted and/or prohibited uses of the content and/or one or more conditions that must be satisfied in order to make use of the content, or that must be satisfied as a condition or consequence of use. While FIG. 2 shows the license being associated with the content by entity 202, it will be appreciated that in other embodiments such licenses could be associated and/or modified by another entity (e.g., a redistributor or other rightsholder). Of particular relevance here, the license may specify how the various zones in the piece of content are to be handled, and whether any reporting information regarding access to or other use of the zones is to be recorded. For example, the license may indicate requirements such as that a warning zone cannot be skipped, but can be fast-forwarded through; that after a preview is viewed once, it can be skipped on subsequent playbacks; that previews will no longer be displayed after a certain date; that advertisements must be viewed (and can't be skipped or fast-forwarded through) if the user is not a subscriber to a premium service and/or has not paid more than a predefined amount for the content; that information about whether certain zones were skipped or fast-forwarded through must be recorded; that information regarding the number of times a particular zone has been viewed must be recorded; and/or virtually any other sort of requirement that the digital rights management system is capable of enforcing.

As shown in FIG. 2, the packaged content 204 and associated license (or licenses) 206 are distributed to end users via any suitable mechanism (e.g., via download or stream over a network 212 like the Internet, a local area network, a wireless network, a virtual private network 207, a wide area network, and/or the like; via recordable media 216 such as a compact disc (CD), digital versatile disk (DVD), a flash memory card (e.g., a Secure Digital (SD) card), and/or the like; via cable, satellite, broadcast, or cellular communication 214; and/or the like), where the content is rendered for the user 208 in accordance with the terms of the associated license. As shown in FIG. 2, packaged content 204 can be delivered to the user together with license 206 in a single package or transmission 213, or in separate packages or transmissions received from the same or different sources.

Typically, the license terms will be enforced by a digital rights management engine running on the user's system 208. The end user's system (e.g., a personal computer 208*e*, a mobile telephone 208*a*, a television and/or television set-top box 208*c*, a portable audio and/or video player 208*d*, an electronic book reader, a gaming system, a person digital assistant, and/or other electronic device) will typically contain application software 216, hardware, and/or special-purpose logic that is operable to retrieve and render the content. The user's digital rights management engine 218 will evaluate the license 206 associated with the packaged content 204 and enforce the terms thereof (and/or enable application 216 to enforce such terms), such as by selectively granting the user access to the content only if permitted by the license. Digital rights management engine 218 may be structurally or functionally integrated with application 216, or may comprise a separate piece of software and/or hardware. Alternatively, or in addition, a user's system, such as system 208*c*, may communicate with a remote system, such as system 208*h*, (e.g., a server, another device in the user's network of devices, such as a personal computer or television set-top box, and/or the like) that uses a digital rights management engine to make a determination 220 as to whether to grant the user access to content previously obtained or requested by the user.

The digital rights management engine, and/or other software on the user's system, or in remote communication therewith, may also record information regarding the user's access to or other use of the protected content. In some embodiments, some or all of this information might be communicated to a remote party (e.g., a clearinghouse 222, the content creator, owner, or provider 202, the user's manager, an entity acting on behalf thereof and/or the like), e.g., for use in allocating revenue (such as royalties, advertisement-based revenue, etc.), determining user preferences, enforcing system policies (e.g., monitoring how and when confidential information is used), and/or the like. It will be appreciated that while FIG. 2 shows an illustrative DRM architecture and a set of illustrative relationships, the systems and methods described herein can be practiced in any suitable context, and thus it will be appreciated that FIG. 2 is provided for purposes of illustration and explanation, not for purposes of limitation.

Figure 3:
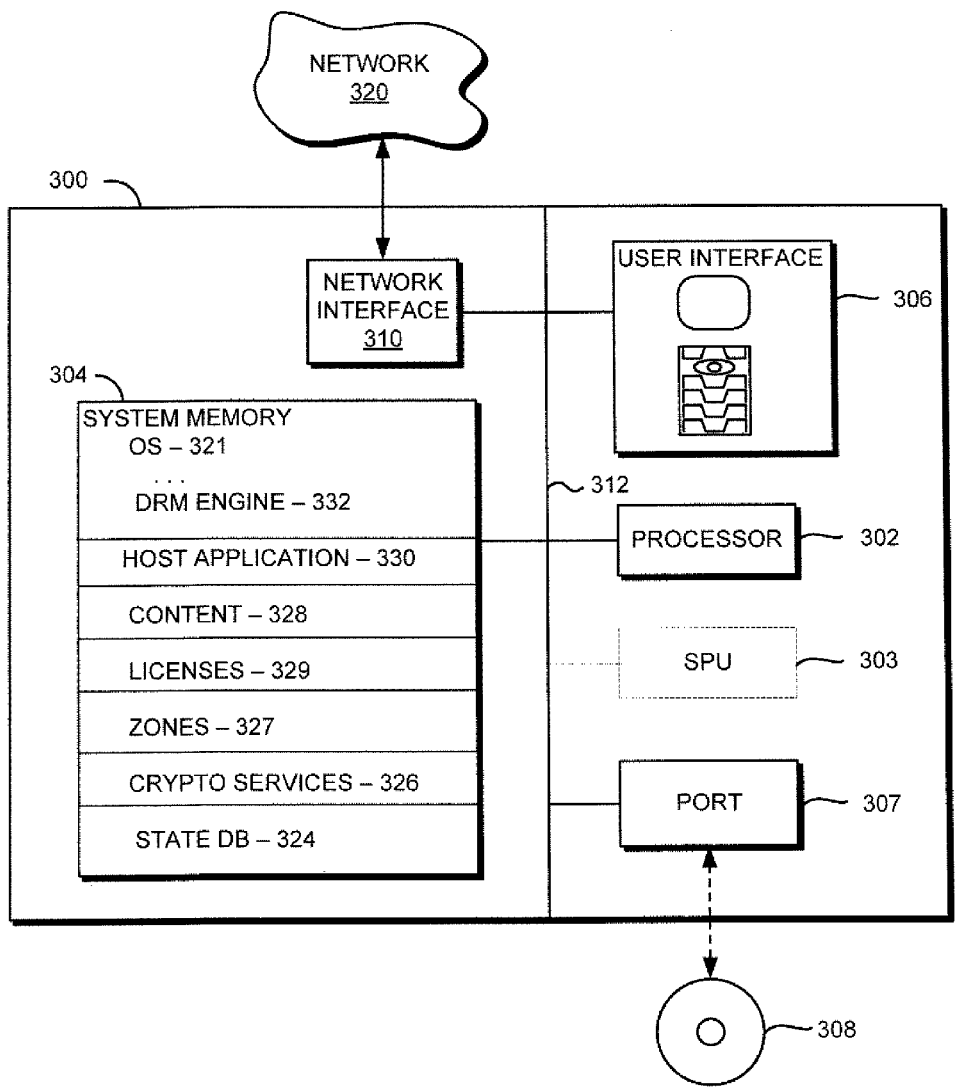
FIG. 3 shows a more detailed example of a system that could be used to practice embodiments of the inventive body of work.

FIG. 3 shows a more detailed example of one possible embodiment of a system 300 that could be used to practice embodiments of the inventive body of work. For example, system 300 might comprise an embodiment of an end user's device 208, a content provider's device 202, and/or the like. For example, system 300 may comprise a general-purpose computing device such as a personal computer 208e or network server 207, or a specialized computing device such as a cellular telephone 208a, personal digital assistant, portable audio or video player 208d, television set-top box, kiosk, gaming system, or the like. System 300 will typically include a processor 302, memory 304, a user interface 306, a port 307 for accepting removable memory 308, a network interface 310, and one or more buses 312 for connecting the aforementioned elements. The operation of system 300 will typically be controlled by processor 302 operating under the guidance of programs stored in memory 304 (and/or other computer-readable media, such as removable memory 308). Memory 304 will generally include both high-speed random-access memory (RAM) and non-volatile memory such as a magnetic disk and/or flash EEPROM. Some portions of memory 304 may be restricted, such that they cannot be read from or written to by other components of the system 300. Port 307 may comprise a disk drive or memory slot for accepting removable memory 308 such as diskettes, CD-ROMs, DVDs, memory cards, SD cards, other magnetic or optical media, and/or the like. Network interface 310 is typically operable to provide a connection between system 300 and other computing devices (and/or networks of computing devices) via a network 320 such as the Internet or an intranet (e.g., a LAN, WAN, VPN, etc.), and may employ one or more communications technologies to physically make such a connection (e.g., wireless, Ethernet, and/or the like). In some embodiments, system 300 might also include a processing unit 303 that is protected from tampering by a user of system 300 or other entities. Such a secure processing unit can help enhance the security of sensitive operations such as key management, signature verification, and other aspects of the digital rights management process.

As shown in FIG. 3, memory 304 of computing device 300 may include a variety of programs or modules for controlling the operation of computing device 300. For example, memory 304 will typically include an operating system 321 for managing the execution of applications, peripherals, and the like; a host application 330 for rendering protected electronic content; and a DRM engine 332 for implementing some or all of the rights management functionality described herein. As described elsewhere herein and in the '693 application, DRM engine 332 may comprise, interoperate with, and/or control a variety of other modules, such as a virtual machine for executing control programs, a state database 324 for storing state information, and/or one or more cryptographic modules 326 for performing cryptographic operations such as encrypting and/or decrypting content, computing hash functions and message authentication codes, evaluating digital signatures, and/or the like. Memory 304 will also typically include protected content 328 and associated licenses 329, and may also include zones 327 that are to be dynamically inserted into the content, as well as cryptographic keys, certificates, and the like (not shown).

One of ordinary skill in the art will appreciate that the systems and methods described herein can be practiced with computing devices similar or identical to that illustrated in FIG. 3, or with virtually any other suitable computing device, including computing devices that do not possess some of the components shown in FIG. 3 and/or computing devices that possess other components that are not shown. Thus it should be appreciated that FIG. 3 is provided for purposes of illustration and not limitation.

The discussion herein focuses primarily on the enforcement of license restrictions relating to media zones, with the assumption that if the DRM engine and host application operate as intended, the terms of the license will be enforced. In practical applications of the systems and methods described herein, protection of the DRM engine and/or the environment in which the DRM engine runs (e.g., the applications and hardware with which it interacts) from malicious tampering or modification can be accomplished using any suitable combination of security techniques. For example, cryptographic mechanisms such as encryption, digital signatures, digital certificates, message authentication codes, and the like can be employed, e.g., as described in the '693 application, to protect the DRM engine, host application, and/or other system software or hardware from tampering and/or other attack, as could structural and/or tactical security measures such as software obfuscation, self-checking, customization, watermarking, anti-debugging, and/or other mechanisms. Representative examples of such techniques can be found, for example, in U.S. Pat. No. 6,668,325 B1, Obfuscation Techniques for Enhancing Software Security, and in commonly assigned U.S. patent application Ser. No. 11/102,306, published as US-2005-0183072-A1, and entitled Software Self-Defense Systems and Methods; U.S. patent application Ser. No. 11/737,428, published as US-2008-0028474-A1, and entitled Systems and Methods for Watermarking Software and Other Media; U.S. patent application Ser. No. 10/172,682, published as US-2003-0023856-A1, and entitled Software Self-Checking Systems and Methods; U.S. patent application Ser. No. 11/338,187, published as US-2006-0123249-A1, and entitled Trusted Storage Systems and Methods; and U.S. Pat. No. 7,124,170 B1, Secure Processing Unit Systems and Methods, each of which is hereby incorporated by reference in its entirety. Alternatively, or in addition, physical security techniques (e.g., the use of relatively inaccessible memory, secure processors, secure memory management units, hardware-protected operating system modes, and/or the like) can be used to further enhance security. Yet another form of security can be provided by the institutional design and operation of the system, and by the legal and social regulation of the participants therein. For example, entities in the system may be required to contractually agree to adhere to system specifications and requirements, may need to submit to a certification process during which the entity's compliance with system requirements could be verified, and/or the like. For example, a device or application may be required to implement the DRM engine in a way that is compatible with other implementations in the environment, and/or be required to provide a certain type or level of tamper resistance or other security. Digital certificates could be issued that attested to a device's or other entity's compliance with such requirements, and these certificates could be verified before allowing the device or entity to participate in the system, or as a condition of allowing continuing access. Such security techniques will be well-known to one of ordinary skill in the art, and it will be appreciated that any suitable combination of some, none, or all of these techniques could be used depending on desired level of protection and/or the details of the particular application at hand. It will also be appreciated that while certain security mechanisms are described herein in connection with certain embodiments, use of these techniques is not required in all embodiments. Additional, non-limiting information on security techniques that can be used in connection with the inventive body of work is set forth in the '693 application.

A more detailed description of the application of digital rights management techniques to support the definition and enforcement of dynamic media (or other content) zones is provided below. In a preferred group of embodiments, a DRM system employing a DRM engine such as that described in the '693 application (sometimes referred to herein or in the '693 application as the "Octopus" DRM engine) is used. Although the following description of example embodiments will at times refer to such a DRM engine, it will be appreciated that the concepts illustrated in this description could be readily applied in the context of a different type of DRM system.

Figure 4:
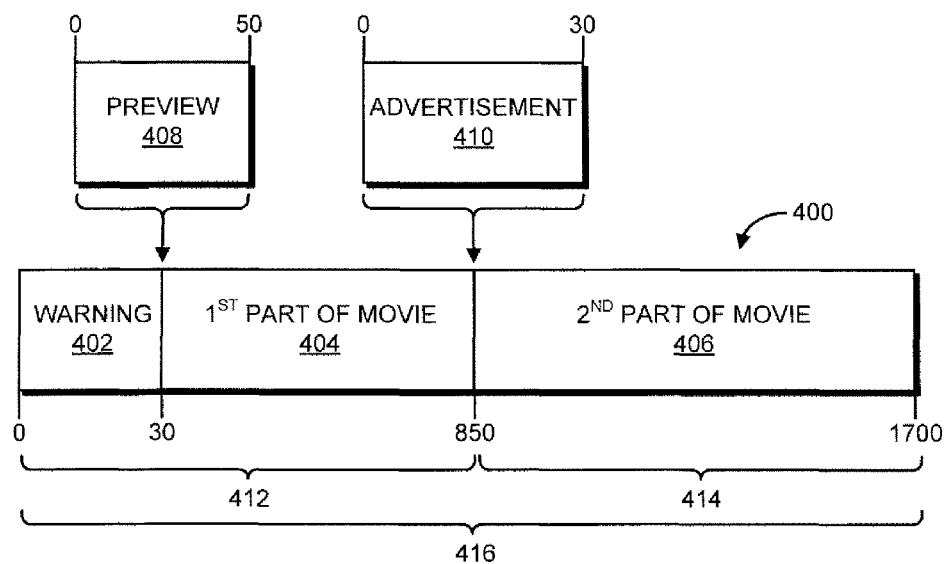
FIG. 4 shows a piece of content encoded in accordance with one embodiment.
Figure 5:
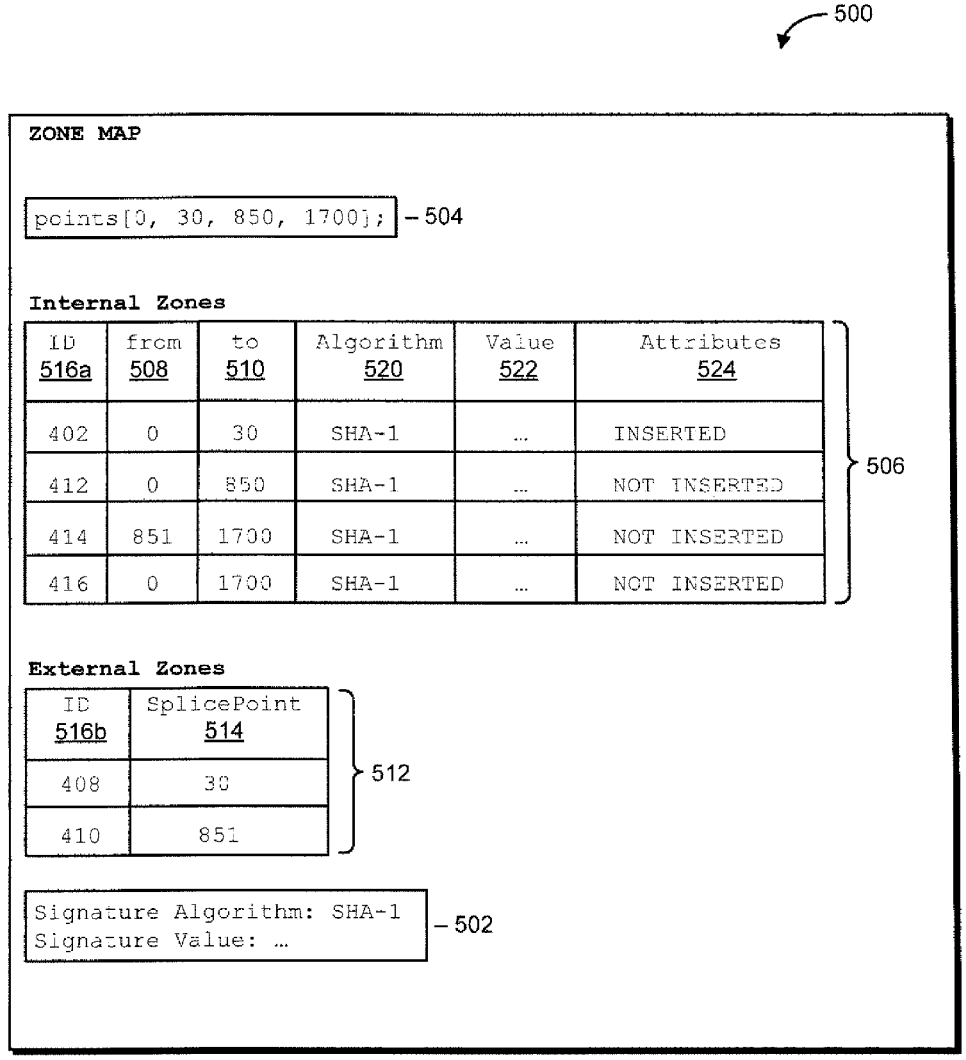
FIG. 5 shows an illustrative data structure description of the zones associated with the piece of content shown in FIG. 4.

FIG. 4 shows a piece of content 400 comprised of a variety of zones, and FIG. 5 shows how these zones may be defined in accordance with one embodiment. As shown in FIG. 4, content 400 includes a zone 402 that contains a warning screen, a zone 404 that contains the first part of a movie, and a zone 406 that contains the second part of a movie. In addition, as shown in FIG. 4, it is desired to insert a zone comprising a preview 408 and a zone comprising an advertisement 410 into content 400 at the locations indicated. It may also be desirable to treat the entire piece of content 400 as a zone 416, and to treat the warning, the preview, and the first part of the movie as a zone 412, and the advertisement and the second part of the movie as another zone 414.

FIG. 5 shows a zone map 500 for defining and describing the zones shown in FIG. 4. The zones defined in FIG. 5 are spans of the media stream 400 shown in FIG. 4, and are bounded by two points in that stream. Each point in the points array 504 contains a reference to a random access point in the media stream (e.g., a sample, or access unit, in a media format derived from the ISO Base Media Format) at which a zone stops or starts. Internal zones 506 are indicated by a start point 508 and an end point 510 in the media stream. For example, zone 402 (i.e., the warning screen) ranges from access unit 0 to access unit 30. External zones 512 are indicated by a point 514 in the media stream where a portion of another media stream (e.g., preview 408 or advertisement 410) is to be spliced. In the embodiment shown in FIG. 5, zone map 500 also has a signature 502 that prevents zone map 500 from being modified by entities that do not have knowledge of a specific key.

In one embodiment, zone identifiers 516 are used to identify each zone. Zone identifiers allow an application to locate the appropriate media zone when signaled, e.g., in a DRM license. In one embodiment, zone identifiers 516 are local to a specific content item, and the ZoneMapKey that is used to sign the zone map ties the zones to specific content. In a preferred embodiment, the ZoneMapKey comprises a hash of the content encryption key. In this way, the ZoneMapKey is essentially uniquely tied to the content, yet the actual content key need not be disclosed to the creator of the zone map, who may not be the same as the entity responsible for creating or maintaining the content keys. This can be especially useful in the case of the zone maps for external zones, such as an external zone containing an advertisement created and/or provided independently of the content into which it is to be inserted, since the content creator may not trust such an independent entity with the content decryption key, yet it would still typically be important to protect against unauthorized substitution of different content for the intended advertisement. By signing the zone map with a hash of the content decryption key, a strong linkage is created between the zones and the associated content, without compromising the secrecy of the content decryption key.

In some embodiments there may be more than one zone with the same identifier in a zone map, and there may be more than one zone map containing zones with the same zone identifier. In this case, any valid zone can be used. The possibility of having more than one zone with the same identifier allows for models where multiple different media streams for a zone are delivered to a player application that then chooses one of the valid zones when rendering a media presentation. Any suitable mechanism can be used by an application to choose between multiple zones with the same identifier.

As shown in FIG. 5, the zone map may identify a digest algorithm 520 for some zones, and a value 522 of the digest for each such zone. In one embodiment, when the media player plays a zone that has digest algorithm, it computes the zone digest as the zone is being played. When the zone has been completely played, it compares the value of the computed digest with the value contained in the zone map for that zone, and, if the values are not equal (e.g., because the zone is not intact), stops any further playback of the presentation.

TABLE 0 shows a more detailed illustration of the abstract data types that make up a zone map such as that shown in FIG. 5 in one preferred embodiment:

TABLE 0

```
ZonePoint: {
    accessUnitReference: <media format dependent>
}
InternalZoneInfo: {
    fromPoint: integer
    toPoint: integer
    id: integer
    attributes: integer
    mediaDigestAlgorithm: integer
    mediaDigestValue: byte array
    meteringTag: string
}
ExternalZoneInfo: {
    splicePoint: integer
    id: integer
}
ZoneMap: {
    points: array of ZonePoint
    internalZones: array of InternalZoneInfo
    externalZones: array of ExternalZoneInfo
    signature: {
        signatureAlgorithm: integer
        signatureValue: byte array
    }
}
```

Where:

"accessUnitReference" is a reference to, or identifier of, a position in, or access unit of, the media.

"frompoint" refers to the location in the "points" array of a "ZonePoint" corresponding to the start of a zone.

"toPoint" refers to the location in the "points" array of a "ZonePoint" corresponding to the end of a zone.

"splicepoint" refers to the Location in the "points" array of a "ZonePoint" corresponding to the location in the media at which a zone is to be spliced.

"id" is an identifier for a zone.

"attributes" refers to a bit vector equal to a combination of zero or more flags. An example of one such flag is shown below; however, it will be appreciated that any suitable flag or flags could be used:

| Name | Value | Description |
|---|---|---|
| INSERTED | 1 | If this flag is set, the zone to which it corresponds represents a portion of the presentation that has been inserted in the main presentation (such as an advertisement) and may |

-continued

| Name | Value | Description |
|---|---|---|
| | | be skipped by the player unless otherwise required (e.g., by an obligation). |

"mediaDigestAlgorithm" identifies the digest algorithm used to compute the mediaDigestValue field. In one embodiment, the following algorithm identifiers are defined:

| Name | Value | Description |
|---|---|---|
| NONE | 0 | The mediaDigestValue bytes array is empty (e.g., set to 0) |
| SHA1 | 1 | The bytes of the mediaDigestValue are obtained by computing the SHA-1 hash of the media byte stream. |

"mediaDigestValue" is a media-dependent digest of the media samples that are part of the zone.

"meteringtag" is a string used as a tag for reporting zone playback metering (as described in more detail below).

"points" refers to an array of one or more ZonePoint values.

"internalZones" is an array of one or more InternalZoneInfo records.

"external Zones" is an array of one or more ExternalZoneInfo records.

"signature" refers to a keyed-MAC signature of the points, internalZones, and externalZones arrays. In one embodiment, the MAC algorithm and key are specified by the signatureAlgorithm field.

"signatureAlgorithm" is an identifier of the signature algorithm used to compute the signatureValue field. For example, in one embodiment the following algorithm identifier is defined:

| Name | Value | Description |
|---|---|---|
| HMAC_SHA1_HMK | 0 | The signature value is obtained using HMAC using the SHA-1 hash function. The signature key is obtained by taking the first 16 bytes of the SHA-1 hash of the byte array consisting of the 4 constant bytes 0x4d, 0x44, 0x4d, and 0x5a followed by the bytes of the ZoneMapKey. | signatureValue is the value of the signature specified by the signatureAlgorithm field.

Figure 6:
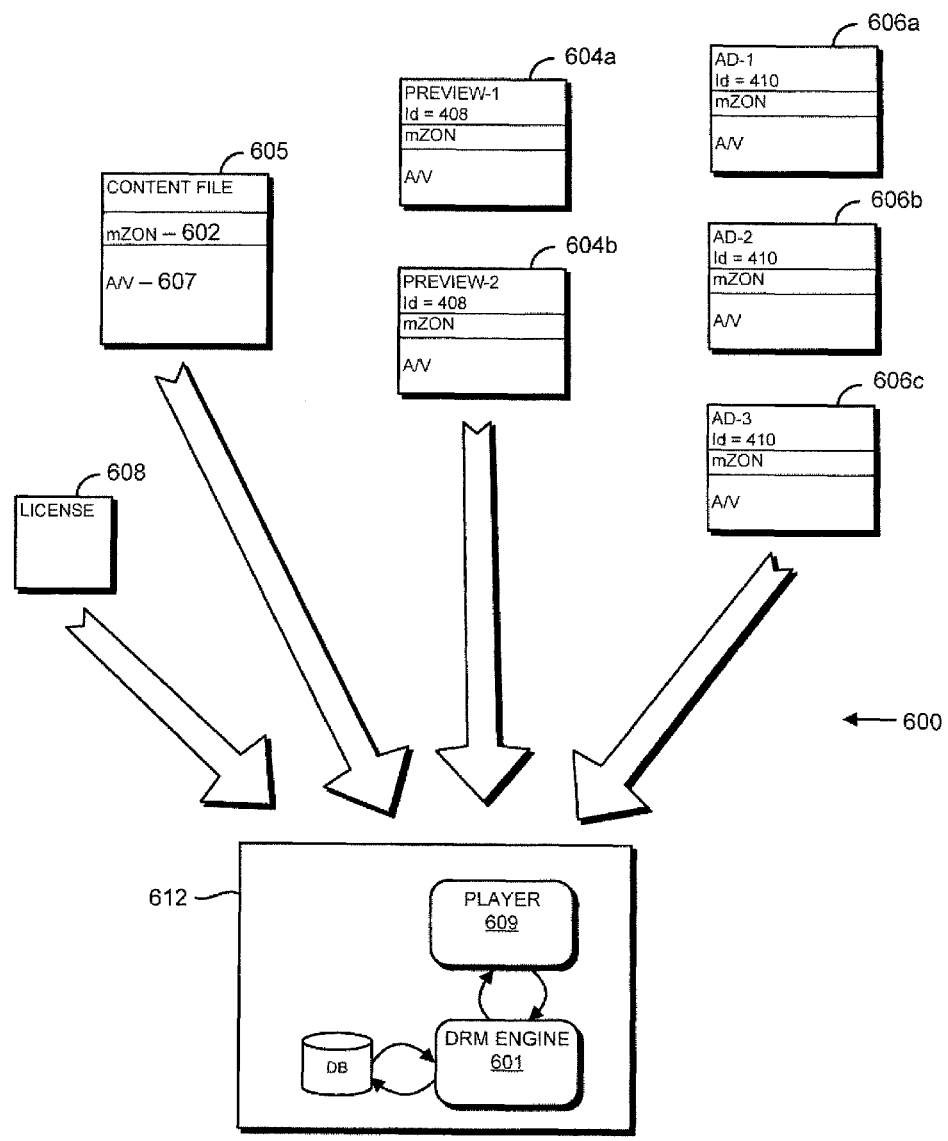
FIG. 6 shows a more detailed illustration of one embodiment of a system for applying digital rights management techniques to manage media zones.

FIG. 6 is a more detailed illustration of a system 600 that uses a DRM engine 601 to manage playback or other rendering of media zones such as those defined in FIG. 5 for a file 605 containing a piece of content 607 such as shown in FIG. 4. As shown in FIG. 6, in a preferred embodiment, a zone map 602 such as that illustrated in FIG. 5 or TABLE 0 is included within the file 605 containing the piece of content 607 containing zones and/or zone markings, which is then packaged into a format required by the DRM engine and content rendering system being employed. For example, content 607 may comprise an mp4 audio-visual file, packaged in accordance with the DRM techniques described in the '693 application. As shown in FIG. 6, a license 608 is associated with the content file 605, the license 608 specifying how access to or other use of content 607 is to be governed, and, of particular relevance here, the manner in which the various zones defined in the content's zone map 602 are to be governed.

FIG. 6 also shows a number of content items 604a, 604b, 606a, 606b, 606c that can be spliced into content 607 at the external zone locations identified in the zone map 602. As previously indicated, in one embodiment external zones referenced in a zone map are zones for which the associated media is not in the same file or container as the media associated with that zone map. External zones allow the media for a zone to be delivered or packaged separately from the main media presentation in which they will be rendered. As shown in FIG. 6, in one embodiment, when a zone map contains references to external zones, the media 604, 606 with the content for each of those zones has an associated zone map with its own internal zone descriptions. In one embodiment, when more than one zone is spliced at the same point, the playback order is the order in which the zones appear in the externalZones array.

As shown in FIG. 6, multiple external zones with the same zone id can be delivered to the user 612. In the example shown in FIG. 6, two different previews 604a and 604b having the same zone identifier are delivered to the user, as are three advertisements 606a, 606b, 606c having the same zone identifier. During playback, application 609 and/or DRM engine 601 can select which of these external zones is actually spliced into the content. This selection can be performed in any suitable manner, based on any suitable criteria. For example, a new preview could be delivered to the user periodically, and the choice of which preview to display could be based on the relative age of the previews (e.g., select the most recently received preview). Alternatively, or in addition, the choice of which preview to display could be based on the content of the previews (e.g., which preview is most similar to the movie 607 contained in file 605), a determination regarding which preview is most likely to appeal to the user based on previously collected demographic or user preference data, random selection, or a combination of these or any other suitable factors. Because the external zones are not embedded in content 607, the same external zone can also be spliced into another piece of content that references the external zone's id. In addition, because external zones contain their own zone maps (and, in some embodiments, may have their own licenses associated therewith), a given external zone may itself reference another external zone that needs to be incorporated into the given external zone during playback.

As previously indicated, DRM engine 601 controls access to or other use of content 607 in accordance with license 608. In particular, DRM engine 601 enforces any license restrictions relating to the zones identified in zone map 602. It will be appreciated that the license can express any suitable restrictions, conditions, or consequences, limited only by the capabilities of the DRM system. For example, without limitation, a license governing the content 400 shown in FIG. 4 may require that the warning screen be viewed the first time the movie is played; that the preview be viewed if it has not been viewed in the last 7 days, but only until a fixed date; that the advertisement be viewed if the user is not a subscriber to a premium service; that the user cannot fast-forward through the advertisement or the preview; that information regarding the playback of various zones be recorded; and/or the like.

In the context of a DRM system such as that described in the '693 application, the expression and enforcement of such conditions may entail the use of one or more callbacks and/or obligations in the control programs that comprise the license. For example, in one embodiment, a control program may include a MediaZones obligation in the extended status block ("ESB") returned by the "Check" and/or "Perform" methods of a playback-related action (e.g., "Play").

In one embodiment, the following constraint may be included in the Obligations container of an ESB:

| Name | Type | Description |
|---|---|---|
| MediaZones | ValueList | One or more ZoneInfo records, where each ZoneInfo record is a ValueList with, e.g., the following values: |

| | Type | Description |
|---|---|---|
| | Integer | Zone Id equal to the 'id' field of one of the zones in the media's Zone Description Table. |
| | Integer | Zone type identifier |
| | Integer | Bit-vector of zero or more OR'ed flag values. Examples of possible flag values are defined below. |

The following are examples of ZoneInfo flag values in one embodiment:

| Name | Value | Description |
|---|---|---|
| METER | 1 | If there is a metering obligation for this content, the application also logs a metering event when this zone has been played. |
| INCLUDE_SPLICE | 2 | If this flag is set the span of media inside this zone includes the media in the zones spliced at its 'end' point, if any. If this flag is not set, the span of media inside this zone does not include the zone(s) spliced at its 'end' point. |

In one embodiment, the following ZoneTypes are defined:

| Name | Identifier | Description |
|---|---|---|
| NOSKIP | 0 | In one embodiment, the player application must not automatically skip this zone; the zone must be played as an integral part of the presentation. |
| MAGNETIC | 1 | In one embodiment, if the player application attempts to seek inside a magnetic zone from a playback position outside the zone, then the playback must begin at the 'fromPoint' point of the magnetic zone. |
| STICKY | 2 | In one embodiment, if the player enters a sticky zone, it must disable the ability to fast-forward or to skip the sticky zone until the playback position is outside the zone. |

In one embodiment, to comply with a MediaZones obligation, a player application must locate at least one valid InternalZoneInfo entry for each of the zones identifiers specified in the ZoneInfo records of the obligation. A valid entry is an entry contained in a zone map for which the signature is valid.

It is possible that in some embodiments the zones described in the MediaZones list may overlap. Also, the same zone may be included more than once with different zone types, in which case that zone has the combined properties of all those types. In one embodiment, when the media player application attempts to seek to a position that is inside more than one magnetic zone, the playback must begin at the earliest 'fromPoint' of all those zones.

A Control may also include an OnZoneCompleted callback notice in the ESB returned by the 'Check' and/or 'Perform' methods of a playback-related action (such as 'Play'). For example:

| Name | Type | Description |
|---|---|---|
| OnZoneCompleted | ValueList | In one embodiment, the host application must callback when the specified zone has been completely played (unless the zone is found not to be intact, as described above). The values in the ValueList are: |

| | Type | Description |
|---|---|---|
| | Integer | Zone Id equal to the 'id' field of one of the zones in the media's zone map |
| | Callback | Routine to call back, and associated cookie. |

In one embodiment, the key—sometimes referred to herein as the "ZoneMapKey"—that is used to bind the zone maps to a specific media content item is one of the content keys used to encrypt the content that is being played and for which the license's control has returned an ESB with a MediaZones obligation. In one embodiment, when there is more than one content key (for example when playing media from a container where the audio and video streams are encrypted with different content keys), the ZoneMapKey can be selected as follows: (a) for audio-only media, the ZoneMapKey is the content key used to encrypt the audio stream; and (b) for video-only or audio/video media, the ZoneMapKey is the content key used to encrypt the video stream.

In one embodiment, when playing content with a metering obligation, if a zone has completely been played and the METERING flag is set for that zone in the MediaZones obligation, the player application logs that event. In one embodiment, when reporting that event in metering data to the metering service, the entry corresponding to that event is reported in one or more event records, and the record(s) only include the "stop" time, omitting the "start" time. In one embodiment, the logical id for the metering record is the string obtained by concatenating the logical id of the metering obligation, the character '#', and the meteringTag field for that zone. In one embodiment, if the content does not have a metering obligation, a player application ignores any METERING flag, and if the content has a metering obligation that is not marked as CRITICAL, the player application may ignore the METERING flag.

EXAMPLES

Figure 7:
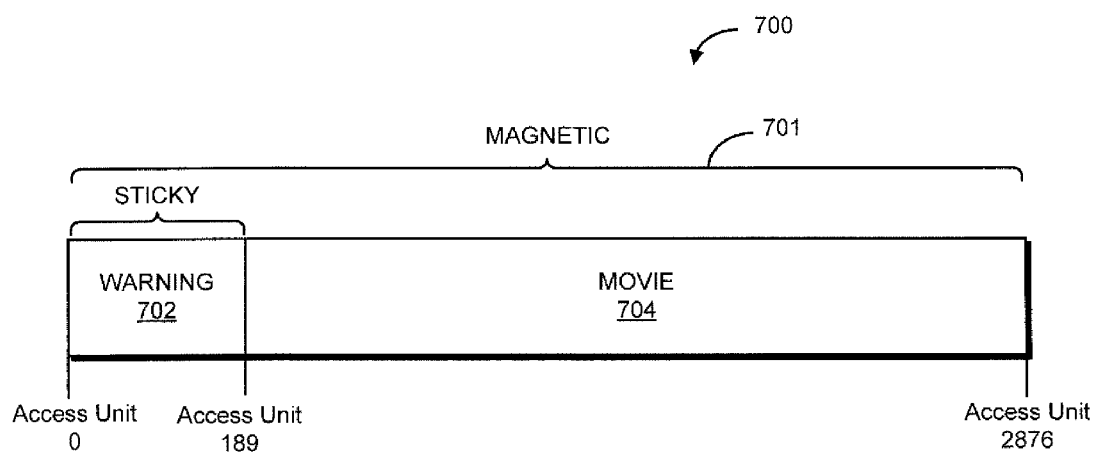
FIG. 7 shows a piece of content encoded in accordance with one embodiment.

FIG. 7 shows an example of a media presentation 700. In the example shown in FIG. 7, media presentation 700 starts with an "FBI Warning" screen 702 that must be viewed before the rest of presentation 704 unless warning screen 702 has already been viewed in the past 30 days. In one embodiment, the zone map for presentation 700 would contain two zones. The warning zone 702 spans access unit 0 to access unit 189. The movie zone 701 spans access unit 0 to access unit 2876.

Figure 8:
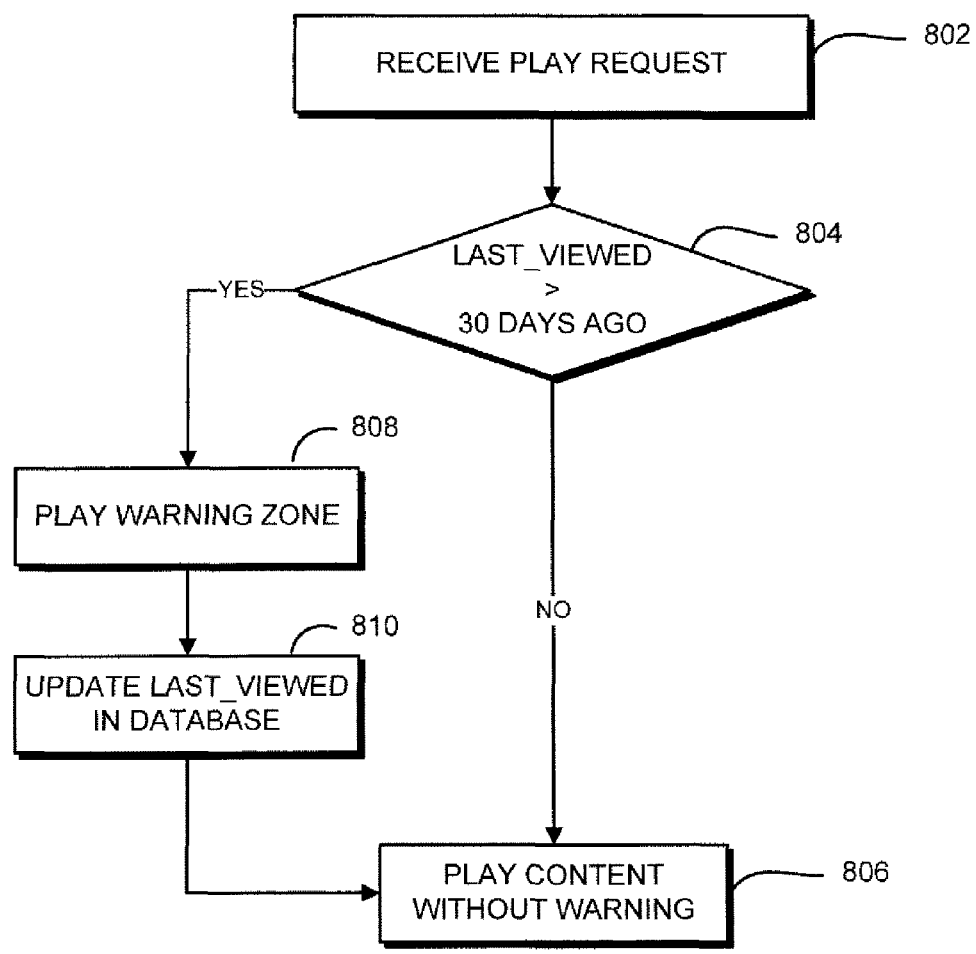
FIG. 8 is a flowchart illustrating the governance of a piece of electronic content in accordance with one embodiment.

FIG. 8 is a flowchart illustrating how the viewing of a piece of content such as presentation 700 in FIG. 7 would be handled in one embodiment. As shown in FIG. 8, when a request to play the presentation is received (802), a determination is made as to whether the warning screen 702 had been previously viewed (or played) within the last 30 days (804). For example, a record of when the zone containing the warning screen had been viewed last could be maintained in a local (or remote) database, and the data retrieved from the database could be compared to the current time in order to determine whether 30 days had elapsed since the warning screen was last viewed. As shown in FIG. 8, if the warning screen had been viewed in the last 30 days (i.e., a "no" exit from block 804), then the presentation would begin playing at zone 704 (i.e., the zone 702 containing the warning screen would be skipped) (806). If the warning screen has not been viewed in the last 30 days (i.e., a "yes" exit from block 804), then the presentation would begin by playing zone 702 (i.e., the warning screen) (808). Once zone 702 has finished playing, the database can be updated to indicate that the warning screen has just been viewed (810), and playback of the presentation can continue to zone 704 (806).

In the illustration shown in FIG. 7, zone 702 has been assigned a "sticky" attribute and the entire presentation has been assigned a "magnetic" attribute. These attributes can be used to prevent circumvention of the requirement that the warning screen (zone 702) be viewed if it has not been viewed in the previous 30 days. In particular, if the warning has not been viewed in the previous 30 days, the DRM engine and/or the player software or hardware will prevent the user from initiating playback at zone 704 (i.e., after the warning). Because the presentation has the "magnetic" attribute, playback of the presentation will commence at the start (i.e., at access unit 0). In addition, because zone 702 has been assigned the "sticky" attribute, the fast-forward and seek features of the player software or hardware will be disabled while this zone is being rendered, thus preventing the user from skipping or fast-forwarding through the warning. However, once the warning zone has been viewed, the user will once again be able to fast-forward and skip to arbitrary locations in the presentation, since the DRM engine will not enforce the sticky or magnetic properties again until another 30 days has elapsed, and an obligation to view the warning once again arises. It will be appreciated that the zones shown in FIG. 7 are for purposes of illustration only, and that content creators can define any suitable zones and viewing requirements.

Figure 9:
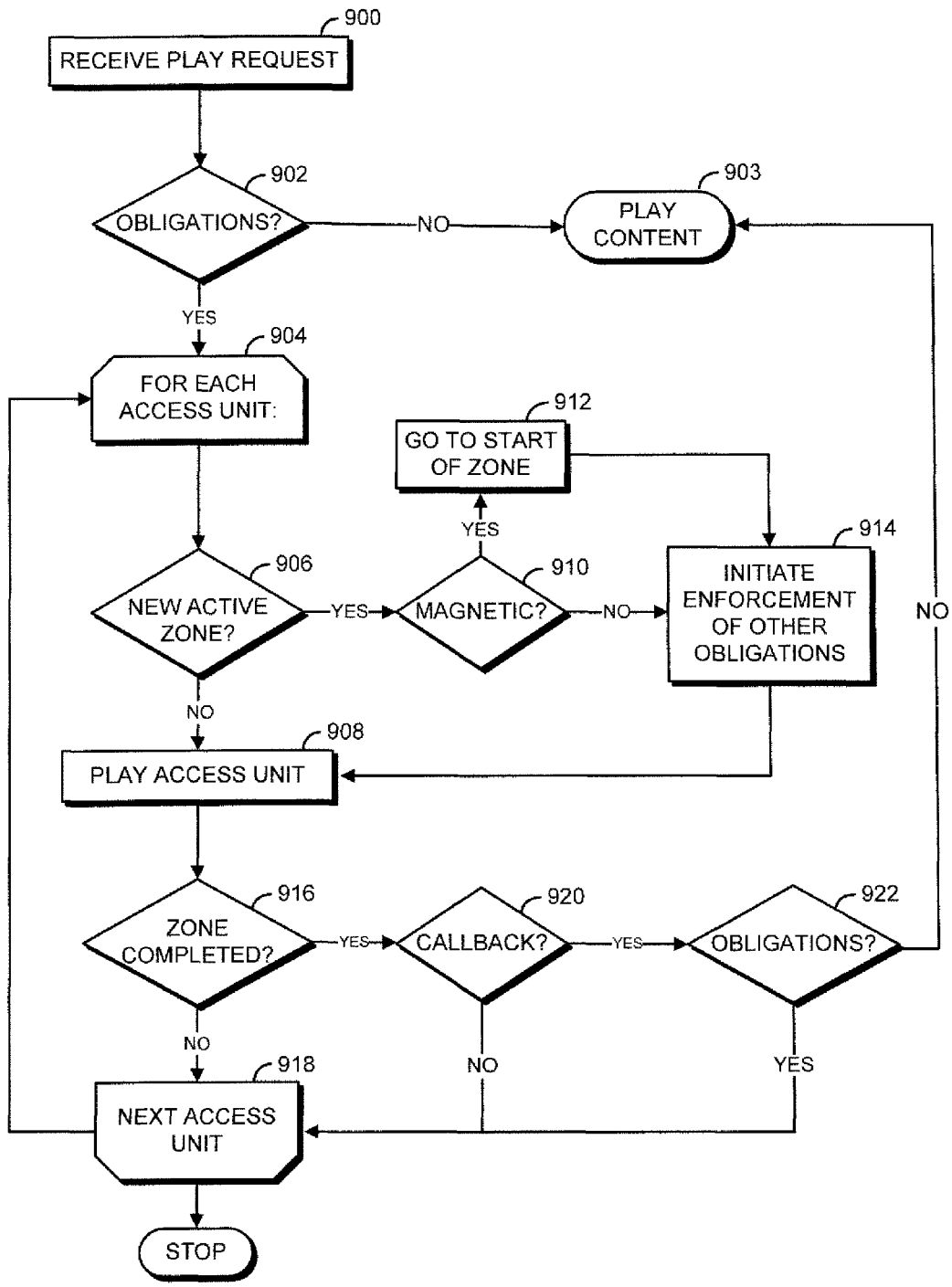
FIG. 9 is a flowchart illustrating how a license governing access to a piece of content may be enforced in one embodiment.

FIG. 9 illustrates the application of zone-related obligations in the context of a piece of content such as that shown in FIG. 7. As shown in FIG. 9, when a request to play the content is received (900), a determination is made as to whether any zone-related obligations exist (902). For example, if a DRM engine such as that described in the '693 application is used, the perform method of the play action would return an extended status block describing any applicable obligations. If no zone-related obligations exist (i.e., a "no" exit from block 902), then playback of the presentation proceeds with the omission of any internal (or external) zones that may have been inserted (903). It on the other hand, one or more zone-related obligations exist (i.e., a "yes" exit from block 902), then, for the requested access unit of the presentation, a determination is made as to whether it is part of a new zone for which obligations exist (referred to in FIG. 9 as an "active" zone) (906). For example, a determination could be made as to whether the previously accessed unit (if any) was in the same zone as the currently requested access unit. If the requested access unit is not in a new zone (i.e., a "no" exit from block 906), then playback of the access unit is permitted (908). However, if the requested access unit is in a new zone (i.e., a "yes" exit from block 906), then a determination is made as to whether the new zone is magnetic (910), and, if the new zone is magnetic (i.e., a "yes" exit from block 910), then the currently requested access unit is replaced with the first access unit in that zone (or zones). Enforcement of any other obligations relevant to the new zone are also initiated (914). For example, if the zone is labeled "no skip," then the seek controls on the player software and/or hardware are disabled, and if the zone is labeled "sticky," then both the seek and the fast-forward controls are disabled before playing the access unit.

In the example algorithm shown in FIG. 9, once an access unit has been played (908), a determination is made as to whether that access unit was the last access unit in an active zone (i.e., whether an active zone was completed) (916). If a zone was completed (i.e., a "yes" exit from block 916), then, if there is a related callback (920), that callback is executed, and the set of relevant obligations is updated (e.g., certain obligations can be removed, updated, or imposed). If no more obligations are active (i.e., a "no" exit from block 922, then playback of the content can continue without any internal (or external) zones that may have been inserted (903). Otherwise, the next access unit is retrieved (918), and the process described above is repeated until playback is stopped (e.g., the user presses or selects "stop" on the player).

It will be appreciated that the example algorithm shown in FIG. 9 has been provided for purposes of illustration, and not limitation, and that enforcement of zone-related obligations could be performed in any suitable manner. For example, some of the steps shown in FIG. 9 could be performed in a different order, concurrently with other steps, or omitted entirely.

Applying the algorithm shown in FIG. 9 to the presentation 700 shown in FIG. 7, if the user attempts to start playback at access unit 190 (i.e., immediately after the warning screen), and the warning screen had not been viewed in the last 30 days (in which case, the magnetic and sticky obligations would be active), the DRM engine and/or application would force playback to begin at access unit 0, since access unit 190 is part of a magnetic zone (i.e., the zone comprising the entire presentation), and access unit 0 is the start of that magnetic zone. In addition, the application's seek and fast forward controls would be disabled since access unit 0 is part of a sticky zone (i.e., the zone comprising the warning screen). Similarly, if the user attempted to start playback at access unit 188 (i.e., immediately before the end of the warning screen), the DRM engine and/or application would force playback to begin at access unit 0, since access unit 188 is part of a magnetic zone (i.e., the zone comprising the entire presentation), and access unit 0 is the start of that magnetic zone. Once access unit 189 was rendered (i.e., the last access unit in zone 702), then a callback would be made that would deactivate the obligations associated with zones 702 and 701, and the presentation could be played without viewing the warning screen, and fast-forwarding and seeking within the presentation would be re-enabled. If the user stops the presentation then restarts it within 30 days, no obligations would be active (since the records maintained by the DRM engine would indicate that 30 days had not elapsed since the warning was last viewed), and the presentation could be played without viewing the warning screen.

An illustrative embodiment of a zone map data structure for the presentation shown in FIG. 7 is shown below in TABLE 1.

TABLE 1

```
ZoneMap: {
    points: [AU-0, AU-189, AU-2876]
    internalZones: [
        {
            fromPoint=0,
            toPoint=1,
            mediaDigestAlgorithm=1,
            mediaDigest=[...],
            id=702,
```

TABLE 1-continued

```
            attributes=1
    },
    {
            fromPoint=0,
            toPoint=2 ,
            mediaDigestAlgorithm=1,
            mediaDigest=[...],
            id=704,
            attributes=0
    },
]
externalZones: [ ]
signature: {
            signatureAlgorithm=0 ,
            signatureValue=[...]
}
```

As shown in TABLE 1, the zone map contains 3 points and two zones. The warning zone spans points 0 through 1 (i.e., access units 0 through 189) and has an attribute value of 1, which means it is an inserted zone in this illustrative embodiment. This indicates to a player that if there are not zone obligations returned by the Perform method of the Play action, it is ok to skip this zone and start directly at access unit 190. The movie zone spans zone points 0 through 2 (i.e., access units 0 through 2876) and has no attribute flags set.

Illustrative pseudo-code for a control that implements the functionality described in connection with FIG. 7 and TABLE 1 is shown in TABLE 2, below:

TABLE 2

```
ESB-1 = {
    ACTION_GRANTED
        Obligations:
            MediaZones: [[702, STICKY], [704, MAGNETIC]]
        Callbacks:
            OnZoneCompleted: [702, (RESET, ZoneCallback, 0)]
}
ESB-2 = {
    ACTION_GRANTED
}
Control.Actions.Play.Perform:
lastViewed =
GetHostObject(/Octopus/SeaShell/Databases/Marlin/ACME/Zones/movie-
0007-warning/lastviewed)
if now-lastViewed > 30 days then:
            return ESB-1 // the zone is magnetic
else:
            return ESB-2 // you can skip the warning
ZoneCallback:
now = GetTrustedTime( )
SetHostObject(/Octopus/SeaShell/Databases/Marlin/ACME/Zones/movie-
0007-warning/lastviewed, now)
return ESB-2 // you can now skip the warning
```

As shown in TABLE 2, when the control is initiated, data is retrieved from the DRM system's state database regarding the last time that the warning was viewed. This is compared to the current time (i.e., "now"), and if the difference is greater than 30 days, an extended status block is returned (i.e., ESB-1) that grants the request to play the content, but imposes obligations on the warning zone (i.e., zone 702) and the entire content (i.e., zone 704) that effectively force the warning to be viewed before the rest of the movie can be viewed. A callback is also included that is initiated when viewing of the warning zone is completed. The callback stores the current time in the DRM system's state database as the time at which the warning was last viewed, and returns an extended status block (i.e., ESB-2) that simply grants playback of the movie without imposing any obligations. Thus, once the warning has been viewed and the callback has been executed, the warning zone will not be rendered and the magnetic zone obligation on the movie will not be enforced for another 30 days.

Figure 10:
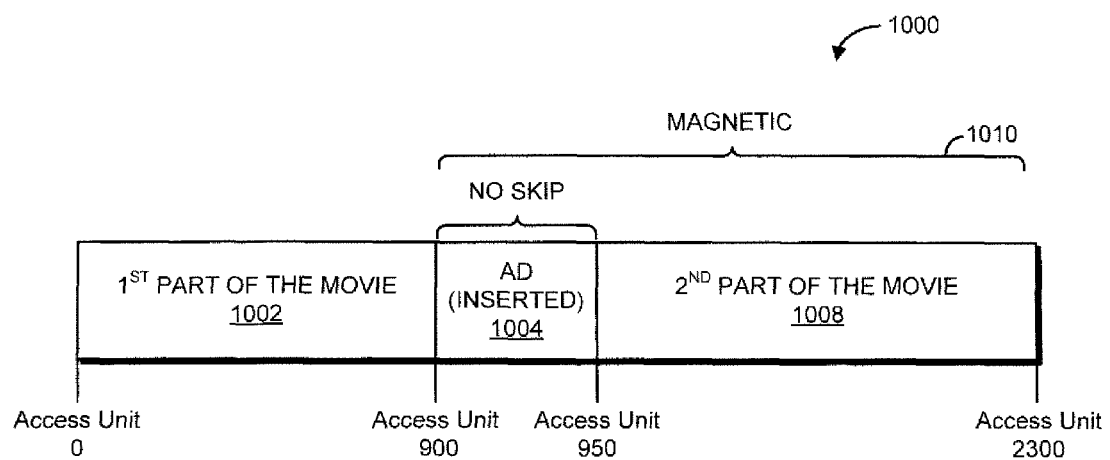
FIG. 10 shows a piece of content encoded in accordance with one embodiment.

FIG. 10 shows an example encoding of a presentation 1000 where it is desired to allow users who have paid for the presentation to view it without advertisements (it will be appreciated that any other condition or combination of conditions that the DRM engine and/or the application is capable of evaluating could be used instead), while requiring users who have not paid for the presentation to view advertisements. As shown in FIG. 10, presentation 1000 could be divided into two zones: a zone 1004 ranging from access unit 900 to access unit 950 corresponding to an inserted advertisement; and a zone 1010 ranging from access unit 900 to access unit 2300 comprising both the advertisement 1004 and the second part of the movie 1008. The advertisement zone 1004 is associated with a "no skip" obligation, and the zone 1010 comprising the advertisement 1004 and the second part of the movie is associated with a magnetic obligation.

When a request to play the second part of the presentation is received, a determination is made as to whether the user has paid for the presentation. This determination could be made, for example, by retrieving data from the DRM engine's database, or by evaluating whether a certain node (such as a subscription node) is reachable from the player's node. If the user has paid for the presentation, then no obligations are returned by the perform method of the control program's play action, and the advertisement is automatically skipped when the presentation is viewed. However, if the user has not paid for the presentation, then the sticky and magnetic obligations illustrated in FIG. 10 are activated, and the user must view the advertisement in order to view the second part of the movie, and is not allowed to skip through the advertisement. For example, if the user attempts to start playback at access unit 951, the player will force playback to actually start at access unit 900, since the zone including access unit 951 is magnetic. Once the advertisement has been viewed, the user can skip within the zone comprising the advertisement and the second part of the movie, but if the user returns to the first part of the movie 1002 and then attempts to jump back to the second part 1008, he will, in this example, need to view the advertisement 1004 once again (or, if the advertisement is an external zone, any advertisement with the same id).

Illustrative pseudocode for a control (such as that described in the '693 application) that implements the functionality described in connection with FIG. 10 is shown in TABLE 3, below:

TABLE 3

```
ESB-1 = {
    ACTION_GRANTED
        Obligations:
            MediaZones: [[1004, NO_SKIP], [1010, MAGNETIC]]
}
ESB-2 = {
    ACTION_GRANTED
}
Control.Actions.Play.Perform:
if (IsNodeReachable("MovieSubscription")) then:
            return ESB-2 // subscribers don't need to view the ads
else:
            return ESB-1 // the zone is magnetic and the ad can't be
            skipped
```

As shown in TABLE 3, when the control is initiated, a determination is made as to whether the user is a subscriber to a movie service. As described in more detail in the '693 application, this is done be determining whether a node representing the subscription (i.e., "MovieSubscription," in this example) is reachable from the player's node. If the subscription node is reachable, then the user is determined to be a paying subscriber, and an extended status block is returned (i.e., ESB-2) that grants the request to play the content without imposing any obligations. However, if the subscription node is not reachable, then an extended status block is returned (i.e., ESB-1) that grants the request to play the content but imposes obligations on the advertisement zone (i.e., zone 1004) and the zone comprising the advertisement and the second part of the movie (i.e., zone 1010) that effectively forces the advertisement to be viewed before viewing the second part of the movie.

It will be appreciated that the complete definition of media zones typically entails the use of precise positioning information within media presentations, thus requiring some media format-specific elements. For purposes of explanation and clarity, abstract data structures and elements common to many media formats have been described herein. For purposes of illustration, specific ways of representing and embedding these data structures and elements into certain, illustrative media formats are described in the following appendices. One of ordinary skill in the art will appreciate, however, that the abstract data types described herein can be readily mapped onto other media formats as well.

APPENDIX A

ISO Base Media File Format Mapping

In one embodiment, when defining zone points for media derived from the ISO Base Media File Format (see, e.g., ISO/IEC 14496-12:2003: Information Technology—Coding of Audio-Visual Objects—Part 12: ISO Base Media File Format), the accessUnitReference field of the ZonePoint structure is an IsoMediaAccessUnit for sample-based formats, or an IsoMediaByteOffset for box-based formats (such as OMA DCF). The notation below is in the syntax description language (SDL) defined in ISO/EC 14496-1:2004, Subpart 3: Information Technology—Coding of Audio-Visual Objects.

```
IsoMediaAccessUnit: {
    sample: integer
}
sample: an integer equal to binary sample number for the media track to
which the zone corresponds.
IsoMediaByteOffset: {
    offset: integer
}
offset: an integer equal to a 0-based offset from the beginning of the
cleartext data for this media.
```

In one embodiment, the zone map associated with a track should be included as an 'mZON' box in a 'udta' container box in the 'trak' box for that track (for track-based media) or the 'udta' container box in the Discrete Media headers box (for, e.g., OMA DCF media).

```
class MediaZoneMap( ) extends Box ('mZON') {
    uint(32) zoneMapDataSize;
    bit(8)   zoneMapData[zoneMapDataSize];
}
```

Where:

"zoneMapData" refers to the binary encoding of the zone map (an example of which is described in more detail below).

"zoneMapDataSize" refers to the size of the binary encoding of the zone map.

In one embodiment, for track-based audio-only presentations, the zone map is included in the audio track, and for track-based audio+video presentations, the zone map is included in the video track. For box-based presentations, the zone map is a descendent of the same container as the one that contains the media data box for the presentation to which the map corresponds.

In one embodiment, for media where the media data consists of access unit samples, the mediaDigestValue for a zone is computed over the byte sequence made of all the sample data from the first sample to the last sample of the zone (included). For media where the media data is represented by a single byte sequence (such as the 'odda' box in OMA DCF), the mediaDigestValue for a zone is computed over the portion of the byte sequence between the start and the end of the zone.

APPENDIX B

Binary Encoding

```
IsoMediaAccessUnit: {
        sample: unsigned int (32)
}
IsoMediaByteOffset: {
        sample: unsigned int (64)
}
InternalZoneInfo: {
    fromPoint: unsigned int (32)
    toPoint: unsigned int (32)
    id: unsigned int (32)
    attributes: unsigned int (8)
    mediaDigestAlgorithm: unsigned int (8)
    mediaDigestValue: {
        mediaDigestValueDataSize: unsigned int (8)
        mediaDigestValueData: bit (8) [mediaDigestValueDataSize]
    }
    meteringTag: {
        meteringTagDataSize: unsigned int (8)
        meteringTagData: utf-8-char (8) [meteringTagDataSize]
    }
}
ExternalZoneInfo: {
    splicePoint: unsigned int (32)
    id: unsigned int (32)
}
ZoneMap: {
    points: {
        pointCount: unsigned int (32)
        pointElements: ZonePoint [pointsCount]
    }
    internalZones: {
        internalZoneCount: unsigned int (32)
        internalZoneElements: InternalZoneInfo [internalZoneCount]
    }
    externalZones: {
        externalZoneCount: unsigned int (32)
        externalZoneElements: ExternalZoneInfo [externalZoneCount]
    }
    signature: {
        signatureAlgorithm: unsigned int (8)
        signatureValue: {
            signatureValueDataSize: unsigned int (32)
            signatureValueData: bit (8) [signatureValueDataSize]
        }
    }
}
```

Although the foregoing has been described in some detail for purposes of clarity, it will be apparent that certain changes and modifications may be made within the scope of the appended claims. For example, while several examples have been presented in the context of audio-visual content such a movies, it will be appreciate that the systems and methods described herein are suitable for broader application, and can be used in the context of virtually any type of electronic content. For example, without limitation, the systems and methods described herein could be applied to audio content (e.g., a digitally recorded song, a radio broadcast, a podcast, etc.), textual content (e.g., an electronic book or magazine, HTML content, a word processing document, etc.) where the various zones could be defined to include content such as copyright information, advertisements, and the like, or any other suitable electronic content. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A method of packaging a first piece of electronic content, the method being performed on a system comprising at least one processor, the method comprising:
creating, using the processor, a first zone map defining a plurality of zones in the first piece of electronic content; and
associating an electronic license with the first piece of electronic content, the license comprising at least one control program, the license defining one or more conditions associated with access to or other use of at least part of the first piece of electronic content on a device, the control program being operable, when executed on the device, to determine that a first predefined condition associated with a first zone defined in the first zone map is met, and, after the first predefined condition is met, to impose a first obligation on access to or other use of the first zone;
in which the first zone map further comprises a reference to at least one external zone, the external zone comprising a second piece of electronic content, the second piece of electronic content being separate from the first piece of electronic content, the second piece of electronic content having a second zone map associated therewith, the second zone map defining at least one zone in the second piece of electronic content, and in which the second zone map is signed with a first key derived, using a one-way function, from a second key for decrypting at least part of the first piece of electronic content.

2. The method of claim 1, in which the license includes code for removing the first obligation after a second predefined condition is met.

3. The method of claim 1, further comprising digitally signing the first zone map using a first key operable to decrypt at least part of the first piece of electronic content.

4. The method of claim 1, further comprising digitally signing the first zone map using a first key derived from a second key operable to decrypt at least part of the first piece of electronic content.

5. A method of packaging a first piece of electronic content, the method being performed on a system comprising at least one processor, the method comprising:
creating, using the processor, a first zone map defining a plurality of zones in the first piece of electronic content; and
associating an electronic license with the first piece of electronic content, the license comprising at least one control program, the license defining one or more conditions associated with access to or other use of at least part of the first piece of electronic content on a device, the control program being operable, when executed on the device, to determine that a first predefined condition associated with a first zone defined in the first zone map is met, and, after the first predefined condition is met, to impose a first obligation on access to or other use of the first zone;
in which the first obligation includes a requirement that the first zone be played prior to playing at least a first part of the first piece of electronic content.

6. A method of packaging a first piece of electronic content, the method being performed on a system comprising at least one processor, the method comprising:
creating, using the processor, a first zone map defining a plurality of zones in the first piece of electronic content; and
associating an electronic license with the first piece of electronic content, the license comprising at least one control program, the license defining one or more conditions associated with access to or other use of at least part of the first piece of electronic content on a device, the control program being operable, when executed on the device, to determine that a first predefined condition associated with a first zone defined in the first zone map is met, and, after the first predefined condition is met, to impose a first obligation on access to or other use of the first zone;
in which the first obligation includes a requirement that at least a first part of the first piece of electronic content cannot be skipped.

7. A method of packaging a first piece of electronic content, the method being performed on a system comprising at least one processor, the method comprising:
creating, using the processor, a first zone map defining a plurality of zones in the first piece of electronic content; and
associating an electronic license with the first piece of electronic content, the license comprising at least one control program, the license defining one or more conditions associated with access to or other use of at least part of the first piece of electronic content on a device, the control program being operable, when executed on the device, to determine that a first predefined condition associated with a first zone defined in the first zone map is met, and, after the first predefined condition is met, to impose a first obligation on access to or other use of the first zone;
in which the first obligation includes a requirement that a user cannot fast-forward through at least a first part of the first piece of electronic content.

8. A method being performed on a device comprising at least one processor, the method comprising:
receiving a first piece of electronic content;
receiving a first zone map, the first zone map defining at least a first zone in the first piece of electronic content;
receiving at the device, a license, the license specifying one or more constraints on access to or other use of at least part of the first piece of electronic content, wherein the license comprises at least one control program;
receiving a request to play the first piece of electronic content;
evaluating, using the processor, the license to determine whether to grant the request; and
granting the request in accordance with the license, including imposing at least one zone-related obligation on playback of the first piece of electronic content;
in which evaluating the license comprises executing the control program, and in which the first zone map and the first piece of electronic content are received together in a first file.

9. The method of claim 8, further comprising:
receiving a second piece of electronic content, the second piece of electronic content having a second zone map associated therewith, the second zone map including a first identifier; and
receiving a third piece of electronic content, the third piece of electronic content having a third zone map associated therewith, the third zone map including the first identifier.

10. The method of claim 9, in which the first zone map includes a reference to the first identifier, the method further comprising:
selecting between the second piece of electronic content and the third piece of electronic content; and
playing the selected one of the second piece of electronic content and the third piece of electronic content in connection with playing the first piece of electronic content.

11. A method being performed on a device comprising at least one processor, the method comprising:
receiving a first piece of electronic content and a first zone map, the first zone map defining at least a first zone in the first piece of electronic content;
receiving at the device, a license associated with the first piece of electronic content, the license comprising at least one control program operable to conditionally impose an obligation in connection with rendering at least the first zone;
executing, by the processor, the control program; and
rendering at least the first zone in accordance with the license;
in which the control program is operable to impose the obligation after the control program determines that a first node is not reachable from a second node in an authorization graph.

12. The method of claim 11, further comprising:
recording at least some data relating to the rendering step.

13. The method of claim 11, in which the obligation comprises one or more requirements that must be met in order to render the first zone, and in which the rendering step comprises ensuring that the one or more requirements are met.

14. The method of claim 11, further comprising:
not imposing the obligation if at least a first condition is satisfied.

* * * * *